3,472,811
SULFUR CONTAINING COMPOSITIONS
Jacqueline C. Kane, Leonia, N.J., assignor to Stauffer Chemical Company, New York, N.Y., a corporation of Delaware
No Drawing. Filed Jan. 11, 1968, Ser. No. 697,018
Int. Cl. C09d 5/34
U.S. Cl. 260—41                                7 Claims

ABSTRACT OF THE DISCLOSURE

This invention concerns sulfur compositions useful as sealants and caulking compounds. The compositions are prepared by reacting elemental sulfur and a dialkenyl monosulfide of the formula:

R—S—R wherein R is an alkenyl group of from 2 to 9 carbon atoms. The ratio of sulfur to monosulfide is from 99:1 to 1:1 by weight.

---

This invention relates to sulfur compositions, and more particularly to sulfur compositions useful as sealants and caulking compounds which are prepared by reacting a dialkenyl monosulfide plasticizer of the formula:

R—S—R wherein the groups represented by R are alkenyl groups of from 2 to 9 carbon atoms which can be the same or different.

Although a number of polysulfide sulfur compositions are known, the properties of these compositions are unpredictable. For example, the closely related dialkenyl disulfide-sulfur compositions which are disclosed in U.S. patent application No. 572,633, filed July 20, 1966, are taught to be useful as road marking materials which set minutes after being allowed to return to atmospheric temperature. Quite surprisingly, however, the monosulfide-sulfur compositions of this invention remain tacky and pliable for several weeks under atmospheric conditions.

In accordance with this invention, the sulfur containing compositions are prepared by reacting the alkenyl monosulfide and elemental sulfur for a time and at a temperature sufficient to provide a rubbery and flexible composition.

Examples of suitable alkenyls are allyl, vinyl, crotyl, 2-methylallyl, 2-methyl-2-butenyl, hexenyl, etc. Generally the groups represented by R will be the same but mixed monosulfides can be employed if desired. The alkenyl groups can also contain relatively inert or non-interfering substituents such as, for example, thio ether groups.

The above plasticizers are reacted with sulfur to plasticize same in a weight ratio of from 1:99 to 1:1 and preferably from 5:95 to 1:2. It is desirable to add an alkaline material to aid in combining the reactants, but none is required. A variety of bases can be used as the alkaline material, such as the alkali metal and alkaline earth metal carbonates as well as organic, primary, secondary and tertiary amines. If employed, only a minor amount of alkaline material is used. Generally from about 0.1% to about 2% by weight of the final composition is sufficient.

These compositions, and particularly the diallyl monosulfide-sulfur compositions, set within minutes after mixing with sulfur at a temperature between about 130° C. and 170° C. but are rubbery and flexible and remain so after two weeks storage under atmospheric conditions. Then the compositions become rigid and inflexible. Thus these sulfur compositions can be easily worked into any desired shape but will ultimately set. These properties and others such as strength, hardness and impermeability to water make the compositions particularly well suited for use as caulking compounds, sealants and the like.

To prepare the elastomeric compositions, the sulfur can be first melted and then any fillers, dyes and pigments added with the monosulfide. The order of addition, however, is not critical and the materials can be dry mixed and then heated. Suitable fillers are the neutral or alkaline fillers such as calcium carbonate, titanium dioxide, carbon black, silicas, clays and talcs.

The temperature of the reaction should be maintained between about 118° C. and about 250° C. It is preferable, however, to maintain the temperature of the reaction mixture between about 130° C. and about 170° C.

The alkenyl monosulfide plasticizers are known compounds. For methods of preparation see Reid, Organic Chemistry of Bivalent Sulfur, volume II, p. 108 (Chemical Publishing Co., Inc., New York).

The following examples will serve to illustrate the invention and its preferred embodiments. All parts and percentages in said examples are on a weight basis.

EXAMPLE 1

79 grams of molten sulfur containing 1 gram of calcium carbonate and 20 grams of diallyl sulfide are placed in a 250 cc. stainless steel beaker contained in a heating mantle. After about 25 minutes at 150° C., the mixture became so viscous that it could no longer be stirred. The product was allowed to cool to room temperature and was found to be a dark brown, rubbery material which became hard in about two weeks.

EXAMPLE 2

In accordance with the procedure of Example 1, 15 grams of bis(2-methylallyl)monosulfide and 84 grams of molten sulfur containing 1 gram of calcium carbonate are reacted at 150° C. The product, when allowed to cool, is found to be rubbery but becomes rigid after about a two-week period at room temperature.

EXAMPLE 3

In accordance with the procedure of Example 1, 25 grams of dihexenyl monosulfide and 74 grams of molten sulfur containing 1 gram of calcium carbonate are reacted at 150° C. The product is found to be rubbery but becomes rigid after about a two-week period at room temperature.

What is claimed is:
1. Sulfur composition comprising the reaction product of elemental sulfur and a dialkenyl monosulfide of the formula:

R—S—R wherein the groups represented by R are alkenyl of from 2 to 9 carbon atoms, in a ratio of sulfur to monosulfide of from 99:1 to 1:1 by weight said reaction being conducted at a temperature of from about 118° C. and about 250° C.

2. A composition according to claim 1 wherein the ratio of sulfur to monosulfide is from 95:5 to 2:1.

3. A composition according to claim 1 wherein the monosulfide is diallyl monosulfide.

4. A composition according to claim 1 wherein the monosulfide is bis(methylallyl)monosulfide.

5. A composition according to claim 1 wherein the monosulfide is dihexenyl monosulfide.

6. A composition according to claim 1 additionally comprising a minor amount of an alkaline material.

7. A composition according to claim 6 wherein the alkaline material is calcium carbonate.

References Cited

UNITED STATES PATENTS 2,769,802  11/1956  Pritchard _____ 260—79.7

DONALD E. CZAJA, Primary Examiner

M. I. MARQUIS, Assistant Examiner

U.S. Cl. X.R.

260—79, 79.7, 609